(12) United States Patent
Chudasama et al.

(10) Patent No.: US 12,408,724 B2
(45) Date of Patent: Sep. 9, 2025

(54) INTERACTIVE PROTECTION SYSTEM

(71) Applicant: TVS MOTOR COMPANY LIMITED, Chennai (IN)

(72) Inventors: Shivamkumar Dharmendrasinh Chudasama, Chennai (IN); V Ramalingam, Chennai (IN); Ajay Kumar Vasu, Chennai (IN); Datta Rajaram Sagare, Chennai (IN)

(73) Assignee: TVS Motor Company Limited, Chennai (IN)

( * ) Notice: Subject to any disclaimer, the term of this patent is extended or adjusted under 35 U.S.C. 154(b) by 0 days.

(21) Appl. No.: 18/010,772

(22) PCT Filed: Oct. 2, 2020

(86) PCT No.: PCT/IN2020/050849
§ 371 (c)(1),
(2) Date: Dec. 15, 2022

(87) PCT Pub. No.: WO2021/260714
PCT Pub. Date: Dec. 30, 2021

(65) Prior Publication Data
US 2023/0263258 A1 Aug. 24, 2023

(30) Foreign Application Priority Data
Jun. 24, 2020 (IN) .............................. 202041026642

(51) Int. Cl.
*B60Q 1/00* (2006.01)
*A41D 1/00* (2018.01)
(Continued)

(52) U.S. Cl.
CPC ................ *A42B 3/30* (2013.01); *A41D 1/002* (2013.01); *G06F 3/165* (2013.01); *G06F 3/167* (2013.01);
(Continued)

(58) Field of Classification Search
CPC ............ A42B 3/30; A41D 1/002; G06F 3/165; G06F 3/167; G10L 13/02; G10L 15/1815;
(Continued)

(56) References Cited

U.S. PATENT DOCUMENTS 6,876,845 B1 *  4/2005  Tabata ................. H04B 1/3822
                                                    455/344
6,978,162 B2 * 12/2005  Russell .................. H04R 1/083
                                                    455/66.1
(Continued)

FOREIGN PATENT DOCUMENTS

CN         206822084 U      1/2018

OTHER PUBLICATIONS

International Search Report issued in corresponding International Application No. PCT/IN2020/050849 mailed Mar. 4, 2021 (4 pages).
(Continued)

*Primary Examiner* — Toan N Pham
(74) *Attorney, Agent, or Firm* — Osha Bergman Watanabe & Burton LLP

(57) ABSTRACT

An interactive protection system of a vehicle includes: a voice assistant that is a combination of a voice assistant application on a user device and a voice cloud platform; an instrument cluster including a cluster controller configured to generate vehicle information based on one or more vehicular sensor data and at least one vehicle wireless transceiver configured to communicate the generated vehicle information to a voice assistant; an audio system disposed in proximity to a head of a user and configured to generate user information; and an audio wireless transceiver configured for receiving a vehicle information from the voice assistant and transmitting the user information to the instrument cluster through the voice assistant for generating subsequent vehicle information.

15 Claims, 9 Drawing Sheets

(51) Int. Cl.
    *A42B 3/30*     (2006.01)
    *G06F 3/16*     (2006.01)
    *G10L 13/02*     (2013.01)
    *G10L 15/18*     (2013.01)
    *G10L 15/22*     (2006.01)
    *H04R 1/02*     (2006.01)
    *H04R 3/00*     (2006.01)

(52) U.S. Cl.
    CPC .......... *G10L 13/02* (2013.01); *G10L 15/1815* (2013.01); *G10L 15/22* (2013.01); *H04R 1/028* (2013.01); *H04R 3/00* (2013.01); *G10L 2015/223* (2013.01); *H04R 2420/07* (2013.01)

(58) Field of Classification Search
    CPC ... G10L 15/22; G10L 2015/223; H04R 1/028; H04R 3/00; H04R 2420/07
    See application file for complete search history.

(56) References Cited

U.S. PATENT DOCUMENTS

| | | | | |
|---|---|---|---|---|
| 10,525,985 | B2 * | 1/2020 | Kinuhata | B60W 50/14 |
| 10,773,764 | B2 * | 9/2020 | Kinuhata | B62J 50/21 |
| 10,959,479 | B1 * | 3/2021 | Babu | B62J 45/41 |
| 2003/0036360 | A1 | 2/2003 | Russell et al. | |
| 2019/0111940 | A1 | 4/2019 | Kinuhata et al. | |
| 2019/0118887 | A1 | 4/2019 | Kinuhata et al. | |

OTHER PUBLICATIONS

Written Opinion issued in corresponding International Application No. PCT/IN2020/050849 mailed Mar. 4, 2021 (8 pages).

* cited by examiner

INTERACTIVE PROTECTION SYSTEM

TECHNICAL FIELD

The present subject matter relates to a vehicle rider protection system. More particularly, an interactive protection and navigation assistance system for the rider of the vehicle is disclosed.

BACKGROUND

There is a huge rise in usage of two wheelers and three wheelers as modes of transport in recent years. Also, accidents due to distraction while riding or riding without a protective gear have also seen a spike in numbers. Rider assistance system, causing reduced distractions, during riding the vehicle is needed to improve rider experience in terms of comfort and safety. Also, with increased safety features, head gears are being manufactured using various types of foams and hard plastics to reduce extent of head injury that occurs during accidents. Implementations for improved safety of the rider involve embedding intelligent electronics into the head gear, while offering physical protection to the head and providing rider assistance to the user.

BRIEF DESCRIPTION OF DRAWINGS

The detailed description is described with reference to the accompanying figures. The same numbers are used throughout the drawings to reference like features and components.

DETAILED DESCRIPTION OF THE INVENTION

Figure 1:
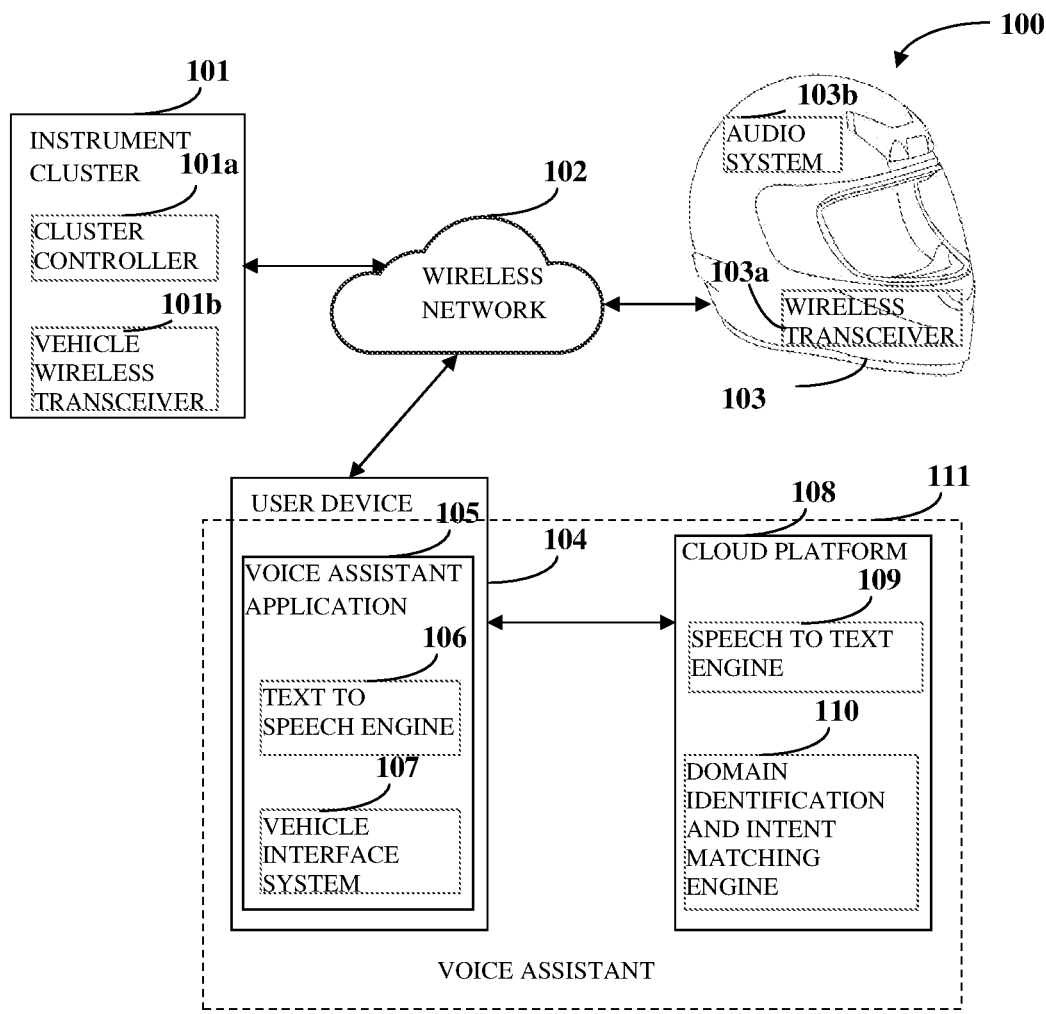
FIG. 1 exemplarily illustrates a schematic diagram of an interactive protection system showing wireless communication of vehicle information and user information between an instrument cluster of a vehicle, an audio system, and a voice assistant.

At present manufacturers embed communication capabilities into the head gears. Some variants have cord running between the head gear and a base unit installed elsewhere. In some variants, a wireless communication means along with antennae is incorporated inside shell, on the shell, and padding of the head gear for communication between the user, the vehicle, and the head gear. The communication means include wireless communication modules, location tracking modules, processor enabling the wireless communication, energy source to drive the modules, etc. Using the wireless communication means of the head gear, the user communicates with the vehicle about the state of the user, the state of the vehicle, call alerts, and navigational guidance in audio form, etc.

However, in such variants, the head gear is bulky with the components crowded in the space available in the head gear and uncomfortable for the user to wear it. Also, the head gear does not provide adequate shock absorption and the communication means distract the user. The energy source driving the modules in the head gear will be of lesser capacity to incorporate it within the head gear. Such less capacity energy source may result in power shortage after a long run and may need recharging during the course of the ride, thereby perturbing the ride. The wireless communication means may be consuming power continuously, even when not in use and need to be invoked only when required, during the course of a trip.

Further, positioning the wireless communication modules, such as, GSM, Wi-Fi, Bluetooth and their respective antennae in close proximity to the head of the user may also inflict the user with radiation related abnormalities in long run, which is not advised. Also, the wireless signal communicated between the head gear and the vehicle may be susceptible to interference with signals from different frequency range. Also, safety of the head gear will be a concern as the head gear and its modules may be stolen, as usually the head gears are tied with the vehicle, while parking. In case of positioning the wireless modules beneath the padding of the head gear, smoothness of the padding has to be ensured to not cause discomfort to the user as well as no compromise on the impact absorbing ability of the head gear.

In some implementations of wireless communication between the head gear and the vehicle, the modules, such as, GSM, GPS, Wi-Fi, and Bluetooth and their antennae, and sensors, such as, an accelerometer, a gyroscope, and a vibration detector are mounted in the vehicle. However, mounting them in a convenient place in the vehicle requires enclosures for water and dust protection and additional power supply routing to the modules. In case the modules are located proximal to handle bar of the vehicle and communicate with the head gear via infrared communication, the region around the handle bar may be crowded distracting the user of the vehicle and infrared is not a secure and efficient way of communication.

For providing navigation guidance to the user, many existing solutions include using a user device with GPS capability mounted in the vehicle, using a separate GPS navigator in the vehicle, using a wireless communication module in the vehicle and wirelessly transmitting the navigation guidance into the head gear using the wireless communication means mounted on the head gear. However, using a user device or a separate GPS navigator device on the vehicle may be distractive while riding, as continuous monitoring of display is necessary. Additionally, mounting the user device is not advisable as the user device is not automotive grade compatible and its durability is not sufficient to withstand shocks, vibration and heat exposure. Mounting the wireless communication means on the head gear has the disadvantages discussed previously. Further to that, cost of the head gear increase with the increase in the complexity of the head gear with the wireless communication means. Thus, manufacturing cost of the head gear also increases.

Further, if call alerts and alerts about the state of the vehicle are communicated to the user using haptic feedback, the haptic feedback may minimally distract the user and convey less information. Also, during the course of a trip, the user may want to control actuation and settings of certain vehicular components, such as, indicators of the vehicle, head lamps, etc. However, physical operation or a user device to control actuation and settings of certain vehicle components may distract the user, affecting the safety of the vehicle and the user. If control information is accessible from a dedicated display unit, such as, an instrument cluster of the vehicle, the cognitive effort required to avail the information from the instrument cluster is quite high, with a limitation on the quality of information presented through this medium.

In cases where wireless audio communication of signals, like navigational guidance, call alerts, control information to the user using a head gear or a wireless enabled head set, is performed, number of queries that can be understood by the processor of the head gear or the controller of the vehicle and the responses to the queries is limited by the memory in the processor. Also, the processors lack the ability to understand the context of the queries, hold a conversation with the user, and learn from the conversations over time.

Therefore, there exists a need for an improved wireless communication of user information, vehicle information, and control information between the user and the vehicle via an audio system with wireless capabilities, providing durability, comfort, safety, and reducing distractions to the user, while overcoming all problems disclosed above as well as other problems of known art.

With the above objective in view, present invention discloses a vehicle with an instrument cluster incorporated on it and communicates with an audio system or an audio system in the head gear via a wireless transmission medium. The head gear comprises an outer shell, an inner shell, a wireless transceiver affixed into the inner shell, such that, the wireless transceiver monitors the rider's capability to ride and gives vehicle information about location, alerts etc. to the user via the audio system. This in-turn increases the rider's safety and comfort. In an embodiment, the present invention utilizes an existing instrument cluster with wireless capability available in vehicles. The vehicle instrument cluster with wireless capability displays vehicle information as well as implements the navigation guidance system, transmitting audio signals to the audio system.

In an embodiment, an interactive protection system of a vehicle comprising an instrument cluster, an audio system, and an audio wireless transceiver is disclosed. The system as per the present subject matter consists of the instrument cluster comprises a cluster controller for generating vehicle information based on vehicular sensor data, and at least one vehicle wireless transceiver for communicating the generated vehicle information to a voice assistant partially embodied in a user device. The audio system is disposed proximal to a head of a user and generates user information and the audio wireless transceiver receives the vehicle information from the voice assistant and transmits the user information to the instrument cluster through the voice assistant for subsequent generation of the vehicle information. In an embodiment, the voice assistant is a combination of a voice assistant application on the user device and a voice cloud platform. The voice assistant comprises a speech to text engine, a domain identification and an intent matching engine, and a text to speech engine for converting the user information into text and the vehicle information into audio form. In an embodiment, the audio system is disposed proximal to an inner surface of a protective gear worn by the user of the vehicle. In another embodiment, the audio system is worn by the user directly on the head of the user.

The protective gear further comprises one or more second sensors for generating second sensor data and a power supply to supply power to the audio system and the audio wireless transceiver. The one or more second sensors are one or more of a sleep sensor and a breath analyzer. The user information comprises an audio input from the audio system and the second sensor data from the one or more second sensors.

A control knob for controlling the operation of the audio system is disposed on at least one surface of the protective gear and a region proximal to the instrument cluster in the vehicle. The voice assistant receives an audio input from the audio system and communicates the vehicle information to the audio system based on processing of the user information and the vehicular sensor data by the cluster controller, at real-time. The voice assistant is invoked using one or more of an interface of the instrument cluster, a voice command, and a control knob of the audio system. The voice assistant controls actuators of a plurality of vehicle components, based on the user information from the audio system. The audio system comprises a microphone for receiving an audio input from the user and at least one speaker transmitting the vehicle information to the user.

The vehicular sensor data is generated by at least one of one or more speed sensors, one or more accelerometers, one or more level sensors, one or more vibration detectors, one or more gyroscope, one or more temperature sensors, one or more location sensors, and one or more pressure sensors mounted on either body of the vehicle or the instrument cluster. The vehicular sensor data comprises indicator status, speed of the vehicle, energy levels of the vehicle, location of the vehicle, vibration of the vehicle, acceleration of the vehicle, tilt of the vehicle, data on ambient conditions, temperature, air pressure of wheels, and gear position. The vehicle information comprises alerts on energy levels of the vehicle, alerts on speed of the vehicle, alerts on indicator status, alerts in tilt of the vehicle, alerts on location of the vehicle, navigation guidance, call alerts, ambient weather, trip information, news coverage, alerts on drop of user device, service history, group ride status, and emergency service assistance.

In another embodiment, an interactive protection system of a vehicle comprising an instrument cluster and a protective gear worn by a user of the vehicle is disclosed. The instrument cluster comprising a cluster controller for generating vehicle information based on vehicular sensor data, and at least one vehicle wireless transceiver for communicating the generated vehicle information to the protective gear of the user. The protective gear comprises an audio system, disposed proximal to an inner surface of the protective gear, for generating user information, and an audio wireless transceiver for receiving the vehicle information from the instrument cluster through the at least one vehicle wireless transceiver and transmitting the user information to the instrument cluster for subsequent generation of the vehicle information.

The protective gear further comprises one or more second sensors for generating second sensor data and a power supply to source power to the audio system and the audio wireless transceiver. The one or more second sensors are one or more of a sleep sensor and a breath analyzer. The user information comprises an audio input from the audio system and the second sensor data from the one or more second sensors. The audio system comprises a microphone for receiving an audio input from the user and at least one speaker transmitting the vehicle information to the user.

In this embodiment, the vehicular sensor data comprises at least one of the parameters from speed of the vehicle, energy levels of the vehicle, location of the vehicle, vibration of the vehicle, acceleration of the vehicle, tilt of the vehicle, data on ambient conditions temperature, air pressure of wheels, and gear position. The vehicle information comprises at least one of the information from alerts on energy levels of the vehicle, alerts on speed of the vehicle, alerts on location of the vehicle, navigation guidance, and call alerts. The vehicular sensor data is generated by at least one of one or more speed sensors, one or more accelerometers, one or more level sensors, one or more vibration detectors, one or more gyroscope, one or more temperature sensors, one or more location sensors, and one or more pressure sensors mounted on one of a body of the vehicle or the instrument cluster.

This embodiment of the interactive protection system comprises a user device, connected with the audio system through the instrument cluster, for receiving calls, receiving messages, and storing media. A control knob for controlling the operation of the audio system is disposed on a surface of the protective gear and/or a region proximal to the instrument cluster in the vehicle.

The cluster controller wirelessly receives the user information from the protective gear and communicates the vehicle information based on processing the user information and the vehicular sensor data at real-time. The protective gear further comprises a heads-up display unit for displaying the vehicle information in augmented reality.

An embodiment of a protective gear worn by a user of a vehicle comprising an audio system and an audio wireless transceiver is disclosed. The audio system, disposed proximal to an inner surface of the protective gear, generates user information and the audio wireless transceiver receives vehicle information from an instrument cluster of the vehicle and communicates the user information to the instrument cluster for subsequent generation of the vehicle information. In this embodiment, the protective gear comprises one or more second sensors for generating second sensor data and a power supply to supply power to the audio system and the audio wireless transceiver. The one or more second sensors comprise a sleep sensor and a breath analyzer. In this embodiment, the vehicle information comprises at least one of an alert on energy levels of the vehicle, alert on speed of the vehicle, alerts on location of the vehicle, navigation guidance, and call alerts based on vehicular sensor data. The vehicular sensor data comprises at least one of a speed of the vehicle, energy levels of the vehicle, location of the vehicle, vibration of the vehicle, acceleration of the vehicle, tilt of the vehicle, data on ambient conditions temperature, air pressure of wheels, and gear position. The vehicular sensor data is generated by at least one of one or more speed sensors, one or more accelerometers, one or more level sensors, one or more vibration detectors, one or more gyroscope, one or more temperature sensors, one or more location sensors, and one or more pressure sensors mounted on one of a body of the vehicle or the instrument cluster.

In an embodiment, a method for wireless communication between a vehicle and a user of the vehicle, executed by an interactive protection system, is disclosed. The embodiment of the interactive protection system comprises an instrument cluster which consists of a cluster controller for generating vehicle information based on vehicular sensor data and at least one vehicle wireless transceiver for communicating the generated vehicle information to a voice assistant partially embodied in a user device, an audio system which is disposed proximal to a head of the user, for generating user information, and an audio wireless transceiver for receiving the vehicle information from the voice assistant and transmitting the user information to the instrument cluster through the voice assistant for subsequent generation of the vehicle information. The method comprises the steps of: invoking the voice assistant using one of an interface of the instrument cluster, a voice command from the audio system, and a control knob of the audio system; receiving the user information from the audio system by the voice assistant; converting the user information to a compatible format of the cluster controller; controlling one or more actuators of a plurality of vehicle components by the cluster controller, based on the converted user information from the audio system; generating vehicle information by the cluster controller from the vehicular sensor data, based on the converted user information; and transmitting vehicle information to the audio system by the voice assistant.

The audio system is disposed proximal to an inner surface of a protective gear worn by the user of the vehicle. A control knob for controlling the operation of the audio system is disposed on at least one surface of the protective gear and a region proximal to the instrument cluster in the vehicle. The voice assistant is a combination of a voice assistant application on the user device and a voice cloud platform.

FIG. 1 exemplarily illustrates a schematic diagram of an interactive protection system 100 showing wireless communication of vehicle information as well as user information between an instrument cluster 101 of a vehicle, an audio system 103b, and a voice assistant 111. The audio system 103b and an audio wireless transceiver 103a together may be a Bluetooth headset with a microphone worn by the user. The Bluetooth headset may comprise at least one speaker. In an embodiment, the audio system 103b and the audio wireless transceiver 103a may be attached to a protective gear 103 worn by the user. The audio system 103b and the audio wireless transceiver 103a transmit user information to the instrument cluster 101. In an embodiment, the protective gear 103 may be a safety gear worn by the user proximal to the head of the user, such as, a collared jacket on the back of the user, a neck support, etc. In a preferred embodiment, the protective gear 103 is a head gear worn by the user. Henceforth, the protective gear 103 is referred to as a head gear, but the implementation of the interactive protection system 100 is not limited to a head gear alone. The vehicle is one of a two-wheeled vehicle, a three-wheeled vehicle, an IC engine vehicle, an electric vehicle, a hybrid electric vehicle, and an autonomous vehicle. The instrument cluster 101 in the vehicle is a display unit of the vehicle that accesses vehicular sensor data, displays, and transmits vehicle information to the user via the audio system 103b, the wireless transceiver 103a, and the user device 104. The vehicular sensor data is generated by at least one of one or more speed sensors, one or more accelerometers, one or more level sensors, one or more vibration detectors, one or more gyroscope, one or more temperature sensors, one or more location sensors, and one or more pressure sensors mounted on one of a body of the vehicle or the instrument cluster 101. The vehicular sensor data comprises at least one of the indicator status, speed of the vehicle, energy levels of the vehicle, location of the vehicle, vibration of the vehicle, acceleration of the vehicle, tilt of the vehicle, data on ambient conditions temperature, air pressure of wheels, and gear position.

The user device 104 is, for example, a cellular phone, a smart phone, a tablet computing device, an Ultrabook®, a laptop, a personal digital assistant, a touch centric device, etc., or any other mobile device configured for a wireless network 102. In an embodiment, the wireless network 102 is a mobile communication network, the Internet, a local area network (LAN), a wide area network (WAN) or the Ethernet, a token ring, or via any appropriate communications media, etc. In a preferred embodiment, the wireless network 102 is Bluetooth® of Bluetooth Sig, Inc. The instrument cluster 101 comprises a vehicle wireless transceiver 101b that enables wireless communication of vehicle information either to the audio system 103b and the audio wireless transceiver 103a or a voice assistant 111 in the user device 104. In an embodiment, the audio wireless transceiver 103a receives the vehicle information directly from the instrument cluster 101. In another embodiment, the vehicle wireless transceiver 101b communicates the vehicle information to the voice assistant 111. The voice assistant 111 is partially embodied in the user device 104 and the voice assistant 111 utilizes the wireless transceiver of the user device 104 to transmit the vehicle information to the audio system 103b through the audio wireless transceiver 103a.

In an embodiment, the voice assistant 111 is a combination of a voice assistant application 105 on the user device 104 and a voice cloud platform 108. The voice assistant application 105 may be an Android based application, an iOS application, a Windows based application, etc. In an embodiment, the voice assistant application 105 is an application provided by an original equipment manufacturer (OEM) of the vehicle, the head gear 103, and the instrument cluster 101, that is available in the Application Store of the user device 104. In an embodiment, the voice assistant application 105 acts as a central node which provides gateway between the instrument cluster 101, the head gear 103, and the voice cloud platform 108. The user device 104 has other applications for call, messaging, and media storage capabilities.

The voice cloud platform 108 is a natural language understanding platform and may be provided as service by service providers. The voice cloud platform 108 carries out speech to text conversion and finding intent of the user. The voice cloud platform 108 comprises a speech to text engine 109 converting an audio input to the text and a domain identification and intent matching engine 110 that finds the intent of the audio input. The voice assistant 111 receives the audio input from the user through the voice assistant application 105. The voice assistant application 105 comprises a vehicle interface system 107 that acquires vehicle information from the instrument cluster 101 and a text to speech engine 106 to convert the vehicle information into audio output. The audio output is transmitted to the audio system 103b via the wireless network 102.

The instrument cluster 101 further comprises a cluster controller 101a that receives vehicular sensor data and generates the vehicle information to be transmitted. In an embodiment, the audio system 103b in the head gear 103 is disposed proximal to an inner surface of the head gear 103. The audio input from the user wearing the head gear 103 is transmitted to the voice assistant 111 through the audio wireless transceiver 103a. The audio system 103b generates user information comprising the audio input. The audio system 103b communicates the vehicle information to the user. The head gear 103 further comprises multiple second sensors, such as, a sleep sensor and a breath analyzer for generating the second sensor data and a power supply to source power to the audio system 103b and the audio wireless transceiver 103a as will be described in FIGS. 3-4. In addition to the audio input, the user information comprises the second sensor data. The user information comprising the second sensor data is processed by the cluster controller 101a for subsequent generation of the vehicle information. The second sensors may be electrically connected to the audio system 103b and thus, the audio system 103b generates the user information.

Figure 2:
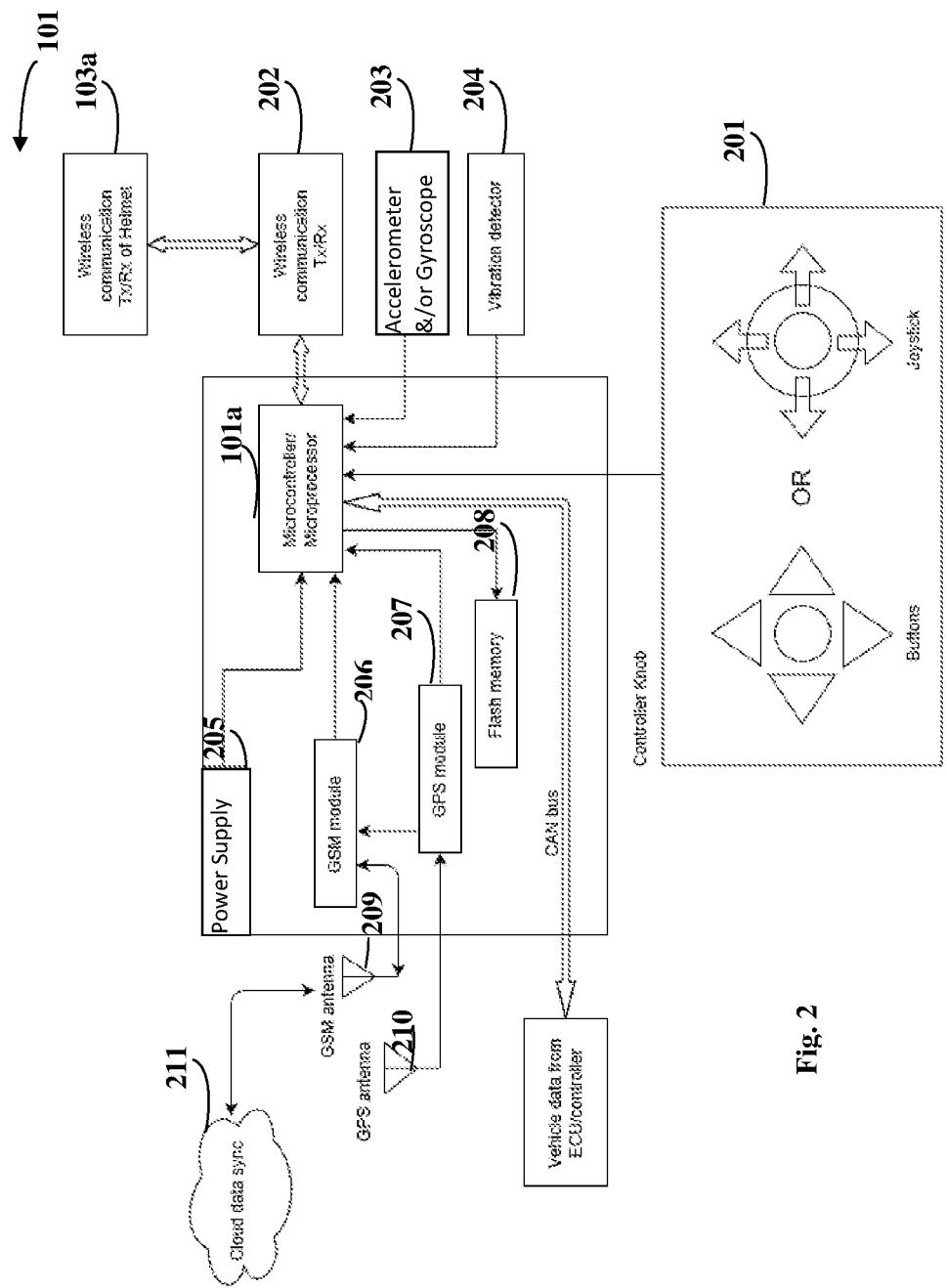
FIG. 2 exemplarily illustrates a block diagram showing an architecture of the instrument cluster of the vehicle.

FIG. 2 exemplarily illustrates a block diagram showing an architecture of the instrument cluster 101 of the vehicle. As exemplarily illustrated, the instrument cluster 101 comprises the cluster controller 101a, a memory unit 208, a power supply 205, the vehicle wireless transceiver 101b as shown in FIG. 1, antennae (not shown) for the wireless transmission, the sensors, such as, an accelerometer and/or a gyroscope 203, a vibration detector 204, a location sensor (not shown?), and a control knob 201. The vehicle wireless transceiver 101b caters to different types of the wireless network 102. The vehicle wireless transceiver 101b may comprise a wireless communication module 202 for any one of the communication media including a Bluetooth, Wireless Fidelity (Wi-Fi) or Infrared means and a Global System for Mobile Communications (GSM) module 206 to communicate the vehicle information to the audio system 103b wirelessly. The GSM module 206 has a corresponding GSM antenna 209. The location sensor is a Global Positioning System (GPS) module 207 with a GPS antenna 210. The power supply 205 drives the operation of the components of the instrument cluster 101.

The cluster controller 101a receives the vehicular sensor data from a controller of the vehicle via a Controller Area Network (CAN) bus of the vehicle and generates the vehicle information. The cluster controller 101a is at least one of a microprocessor, central processing unit (CPU) device, finite state machine, microcontroller, digital signal processor, logic, a logic device, an user circuit, an application specific integrated circuit (ASIC), a field-programmable gate array (FPGA), a chip, a digital circuit, an analog circuit, etc., or any combination thereof, capable of executing a series of commands, instructions, or state transitions. The components such as the GPS module 207, the GSM module 206, and the Wi-Fi/Bluetooth (any wireless communication medium) modules 202, the accelerometer and/or the gyroscope 203, the vibration detector, 204, etc. are fitted inside a casing of the instrument cluster 101. The respective antennae 209 and 210 are placed outside or inside the casing of the instrument cluster 101, or anywhere on the vehicle body according to convenience and efficiency. The instrument cluster 101 further comprises a display unit with a cluster interface (not shown) for displaying the vehicular sensor data and the vehicle information. The cluster controller 101a processes the vehicular sensor data and the sensor data from the sensors 203 and 204 in the instrument cluster 101 and generates vehicle information. The vehicular sensor data and the vehicle information are synchronized with a cloud database 211.

In an embodiment, a region proximal to the instrument cluster 101 comprises the control knob 201 for controlling the operation of the audio system 103b. In another embodiment, the control knob 201 may be located on a surface of the head gear 103. The control knob 201 controls audio levels inside the audio system 103b, call accept/decline, turning on/off the audio system 103b, without losing control of the vehicle. The control knob 201 is placed on the handlebar proximal to the indicator switches of the vehicle. The control knob 201, may be hard press buttons or a joystick, has wired connection with the instrument cluster 101. In an embodiment, the control knob 201 may be a soft press button on the cluster interface of the instrument cluster 101. In an embodiment, the voice assistant 111 is invoked using the selection in the cluster interface and/or the control knob 201. The voice assistant 111 is woken up only when needed to reduce the power consumption of the user device 104.

The GPS module 207 collects satellite data (real-time location data) and transfers it via serial communication to the cluster controller 101a. The satellite data may be in the form of NMEA (National Marine Electronics Association) lines (worldwide standard for location data) which is parsed by the cluster controller 101a, and the cluster controller 101a analyses for navigation guidelines and the cluster controller 101a transmits those navigational guidelines to the audio system 103b via the Bluetooth/Wi-Fi (any wireless communication medium) module 202 in the form of audio. The voice assistant 111 reads out the warnings to the user in a language chosen in the audio system 103b. In an embodiment, cluster controller 101a transfers the real-time location data to the GSM module 206 to be synced on cloud database 211. In an embodiment, the real-time location data may also be stored in the flash memory 208, in case where the GSM network is not available and later on synchronized with the cloud database 211 via the GSM antenna 209, when the GSM network is available.

The accelerometer and/or the gyroscope 203 send orientation and movement related data of the vehicle to the cluster controller 101a which is processed and the cluster controller 101a generates vehicle information comprising alerts and warnings to the user of the vehicle, such as, unusual tilt, unusual acceleration or deceleration. The cluster controller 101a further transmits the alerts and the warnings to the audio system 103b via the Bluetooth/Wi-Fi module (any wireless communication medium) 202 in the form of audio. The voice assistant 111 reads out the warnings to the user in a language chosen in the audio system 103b.

The vibration detector 204 sends sensor data which is further analyzed by the cluster controller 101a to detect accident or predict part failure in the vehicle that comprises the vehicle information. The predicted part failure is indicated to the user as a warning inside the audio system 103b. The voice assistant 111 reads out the warnings to the user in the audio system 103b. In the case of an accident, the cluster controller 101a, based on the sensor data of the vibration detector 204, actuates the user device 104 to dial up emergency contacts of the user and emergency services for earliest assistance to the user.

Vehicular sensor data is collected from any one of an engine control unit (ECU), a controller, a battery management system (BMS), etc. of the vehicle by the cluster controller 101a via the CAN bus. The cluster controller 101a analyses and generates vehicle information comprising critical warnings like low battery/fuel, overheat, part failure, over speed, rash driving, etc. and transmits to the audio system 103b in the form of audio. The voice assistant 111 reads out the warnings to the user in a language chosen, for example, English, Hindi, etc., in the audio system 103b.

The GSM module 206 synchronizes all the vehicular sensor data and the generated vehicle information with the cloud database 211. Any call, SMS or any other notification generated from the user device 104 is visible in the instrument cluster 101 and read out in the audio system 103b and a required action can be taken as per user's wish with the help of the control knob 201. For example, if the user gets a call from one of his/her contact, then the call alerts constituting the vehicle information is notified to the user inside head gear 103 or in the audio system 103b as a voice notification. He/she gets to choose whether to accept/decline the call and take the necessary action with the help of control knob 201. If the user gets a SMS, then the user may be instructed via audio about the same and given an option whether he/she wants to hear the SMS. In an embodiment, the voice assistant 111 reads out the SMS or the call alerts to the user. The user can choose to hear the SMS either with the help of control knob 201 or with audio input and after hearing the SMS, he/she can even choose to send a quick reply back to the sender. The voice assistant 111 facilitates all the operations mentioned above and holds a conversation with the user using the voice cloud platform 108.

Figure 3:
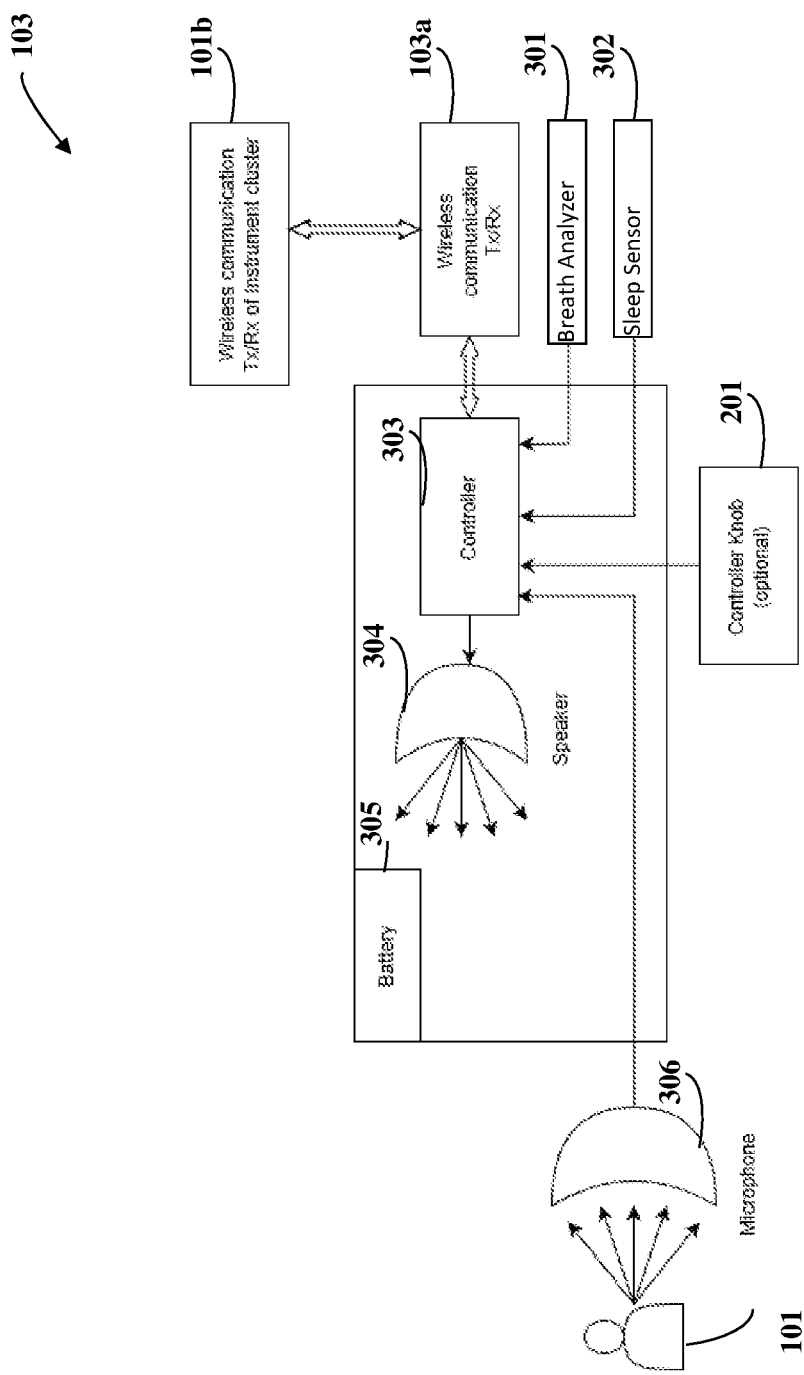
FIG. 3 exemplarily illustrates a block diagram showing an architecture of the head gear worn by the user of the vehicle.

FIG. 3 exemplarily illustrates a block diagram showing an architecture of the head gear 103 worn by the user of the vehicle. The head gear 103 comprises a driver or a controller 303, second sensors 301 and 302, a microphone 306 and at least one speaker, for example, a pair of speakers 304, the audio wireless transceiver 103a, the power supply 305, and the control knob 201. The wireless transceiver 103a is a Bluetooth/Wi-Fi Tx/Rx (any wireless communication medium) module which can connect the head gear 103 with the instrument cluster 101. The second sensors 301 and 302 detect the state of the user, such as, the drowsy state of the user, drunken state of the user using the sleep sensor 302 and the breath analyzer 301. The second sensors 301 and 302 are mounted to the inner surface of the inner shell of the head gear 103 and connected to the controller 303.

The microphone 306 and the pair of speakers 304 constitute the audio system 103b. The speakers 304 are attached on both sides to the inner surface of the inner shell of the head gear 103. The microphone 306 is attached to a front portion of the head gear 103. The speakers 304 and the microphone 306 are wired to the controller. The power supply 305 is a low capacity battery that powers the speakers 304, the microphone 306, the controller 303, and the second sensors 301 and 302. In an embodiment, the control knob 201 is positioned to a side of the inner surface of the inner shell of the head gear 103. The microphone 306 receives the audio input from the user and the speakers 304 deliver the vehicle information to the user. The audio system 103b receives the audio input and the second sensor data from the second sensors 301 and 302 and generates the user information to be transmitted to the voice assistant 111 through the wireless transceiver 103a. In an embodiment, the instrument cluster 101 transmits the vehicle information, such as, call alert to the speakers 304 through the wireless transceivers 101b and 103a of the instrument cluster 101 and the head gear 103. In this embodiment, in response to the call alert, the audio input from the user is transmitted to the instrument cluster 101 through the wireless transceivers 101b and 103a of the instrument cluster 101 and the head gear 103.

The breath analyzer 301 ensures the user is not drunk while riding. The drunk state of the user is transmitted to the cluster controller 101a and based on an analysis of the second sensor data comprising the drunk state, the cluster controller 101a generates a warning and plays the warning in the speakers 304 of the audio system 103b worn by the user alone or the audio system 103b in the head gear 103. The sleep sensor 302 continuously monitors eye movement of the user and detects a pattern in the eye movement and transmits it to the cluster controller 101a. The cluster controller 101a analyses the pattern of the eye movement and detects whether the user is sleepy or not. The cluster controller 101a generates warnings and plays the warning in the speakers 304. The voice assistant 111 reads out the warnings to the user in the speakers 304 of the head gear 103.

The pair of speakers 304 may play songs from the user device 104, give alerts and warnings about the incoming and/or ongoing call, the navigation guidance, etc. In an embodiment, the controller 303 on the head gear 103 will transmit/receive all the above mentioned audio to and from the instrument cluster 101. The microphone 306 will receive the audio input from the user to answer the ongoing call and accept voice commands from the user. The voice assistant 111 may be invoked using a voice command, for example, a wake word from the user.

Figure 4:
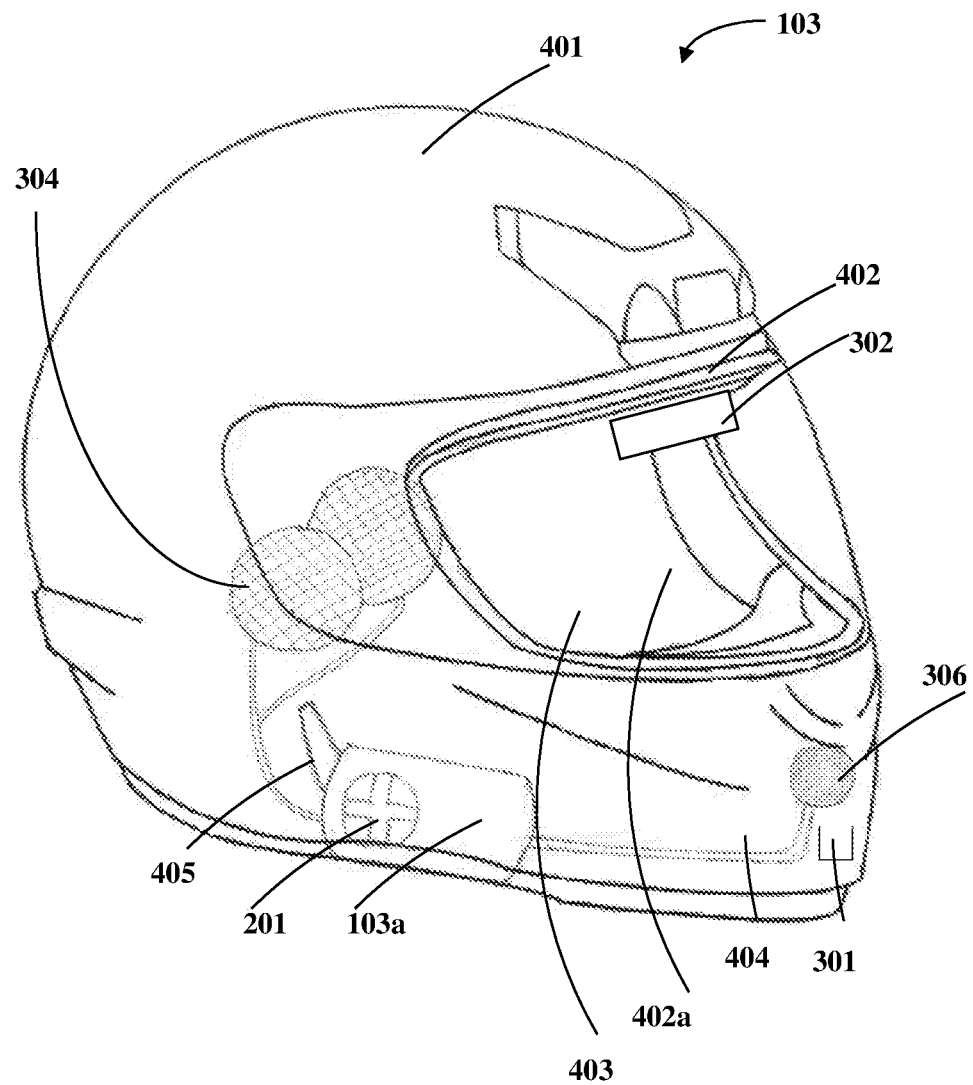
FIG. 4 exemplarily illustrates a perspective view of the head gear.

FIG. 4 exemplarily illustrates a perspective view of the head gear 103. The head gear 103 comprises an outer shell 401, an inner shell 402, a shield 403, and a strap (not shown) to fasten the head gear 103. The head gear 103 comprises the pair of speakers 304 on the two opposite sides of the inner surface 402a of the inner shell 402 of the head gear 103. The microphone 306 is at the front portion 404 of the head gear 103. The microphone 306 and the speakers 304 are connected to the wireless transceiver 103a with an antenna 405, the controller 303 illustrated in FIG. 3, and the control knob 201. In an embodiment, the wireless transceiver 103a and the controller 303 are housed in a casing and the antenna 405 and the control knob 201 are disposed on the casing. Additionally, the breath analyzer 301 is proximal to the microphone 306 of the audio system 103b of the head gear 103 and the sleep sensor 302 is positioned closer to the eyes of the user, on the shield 403 of the head gear 103. In an embodiment, a camera may be mounted on the vehicle body and a video feed can be transmitted to a heads-up display (not shown) inside the head gear 103 ahead of the shield 403 of the head gear 103. The heads-up display may be helpful, when a rear view camera is mounted on the rear of the vehicle. The heads-up display with the audio system 103b may support augmented reality and be helpful to improve navigation of the vehicle. The heads-up display may also display the vehicle information in the text format, such as, vehicle speed, gear position, fuel remaining, alerts related to vehicle etc.

Figure 5:
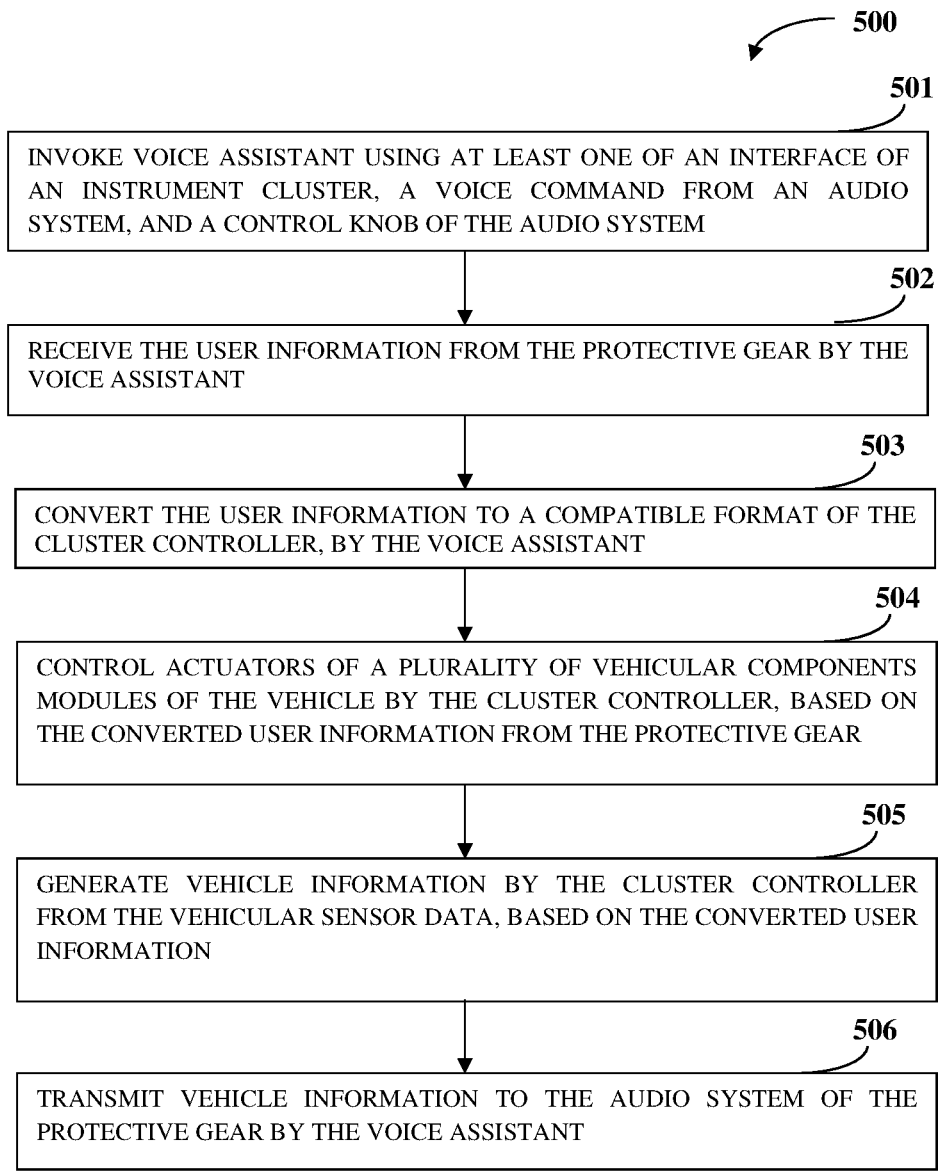
FIG. 5 exemplarily illustrates a flowchart showing a method for the wireless communication between the vehicle and the user executed by the interactive protection system exemplarily illustrated in FIG. 1.

FIG. 5 exemplarily illustrates a flowchart showing a method for the wireless communication between the vehicle and the user executed by the interactive protection system 100 exemplarily illustrated in FIG. 1. At step 501, the voice assistant 111 is invoked using at least one of an interface of the cluster interface of the instrument cluster 101, a wake word from the microphone 306 of the audio system 103b, and the control knob 201 of the audio system 103b. The methods of invoking the voice assistant 111 vary for high speed and low speed of the vehicle. At high speeds, hands-free invoking of the voice assistant 111 using the wake word or the control knob 201 on the handle bar will be used. At low speeds and stand still condition of the vehicle, the voice assistant 111 is invoked using the cluster interface or the control knob 201 in the head gear 103 is used. The voice assistant 111 indicates the invoking of the voice assistant 111 by a start-listening tone in the speakers 304 of the audio system 103b. In an embodiment, the cluster controller 101a indicates the invoking of the voice assistant 111 by playing a predetermined start-listening tone in the speakers 304 of the audio system 103b. At step 502, the voice assistant 111 receives user information from the audio system 103b. That is, the voice assistant 111 receives audio input from the microphone 306 of the audio system 103b. At step 503, the voice assistant 111 converts the audio input to a compatible format of the cluster controller 101a using the speech to text engine 109. The text corresponding to the audio input is transmitted to the cluster controller 101a. The audio input may be an instruction to the cluster controller 101a to control actuation and settings of vehicle components, such as, headlamps, instrument cluster 101, head light beam, illumination logo, seat lock, fuel lock, mode of the vehicle, turn signal indicators, vehicle ride modes etc.

At step 504, the cluster controller 101a controls the actuators of the vehicle components based on the converted audio input. Based on the instruction in the audio input to adjust the settings or turn ON/ OFF of the vehicle components, the cluster controller 101a controls the actuators of the instructed vehicle component. The audio input is identified to identify the vehicle component instructed by the speech to text engine 109. Consider for example, the user wants to change the brightness setting of the instrument, change ride mode of engine or electric motor, control vehicle lamps, the user indicates the same as an audio input in the microphone 306 of the audio system 103b. The speech to text engine 109 and the domain identification and intent matching engine 110 parses the audio input, identifies the vehicle component to be actuated, and the action to be performed. The speech to text engine 109 communicates the actuation to be performed to the cluster controller 101a. The cluster controller 101a may turn ON a LEFT/RIGHT turn signal lamp, turn ON a headlight, switch to high beam headlight, switch to low beam headlight, controls orientation of the headlamp-look up/down/left/right, turn ON illumination logo light, turn ON/OFF hazard switch, ENABLE/DISABLE sport mode, ENABLE/DISABLE limp home mode, change theme of the instrument cluster 101, LOCK/UNLOCK the vehicle, ENABLE/DISABLE park mode or reverse mode of the vehicle etc.

At step 505, the cluster controller 101a generates vehicle information from the vehicular sensor data, based on the audio input. The vehicle information comprises the alerts on energy levels of the vehicle, alerts on speed of the vehicle, alerts on indicator status, alerts in tilt of the vehicle, alerts on location of the vehicle, navigation guidance, call alerts, ambient weather, trip information, news coverage, alerts on drop of user device 104, service history, group ride status, and emergency service assistance. Based on the audio input, the cluster controller 101a processes the vehicular sensor data and generates the vehicle information corresponding to the audio input. The processing of the vehicular sensor data involves comparing the vehicular sensor data with thresholds and performing mathematical computations on the vehicular sensor data and the second sensor data from the head gear 103. At step 506, the voice assistant 111 transmits the generated vehicle information to the speakers 304 of the audio system 103b.

In an embodiment, voice assistant 111 may greet back the user, when the audio input from the user is a greeting, such as, a "HELLO". The voice assistant 111 may introduce itself when asked by the user. When the audio input is an enquiry about tire pressure, the voice assistant 111 access the tire pressure from the cluster controller 101a and responds with the value for the tire pressure and asks the user to refill air if required. When the audio input is about planning a trip, the voice assistant 111 in communication with the cluster controller 101a responds with the duration and distance left for the ongoing trip. When the audio input is about notifications on missed calls from contacts or favorite contacts, SMS or social media notifications, the cluster controller 101a accesses the call and SMS alerts of the user device 104 and generates vehicle information. The voice assistant 111 will spell out the call alert, SMS alert, and social media notification details, such as, contact name, number of missed notifications, etc. in the speakers 304 of the audio system 103b. When the audio input in an enquiry on the weather conditions during the course of the trip, the voice assistant 111 responds accordingly, in co-ordination with the cluster controller 101a. Similarly, the audio input may be an inquiry about the reminders, air quality, navigation, news, service history, medical appointments, personal health, etc. The voice assistant 111 fetches the vehicle information corresponding to each of these and responds to the user in the speakers 304 of the audio system 103b. The audio input may pertain to requests to set alter or reset a reminder, planning, re-planning, rerouting a trip, initiate emergency assistance, positions of fellow riders in a group ride, pay toll, bills, book ticket, order food, switch ON/OFF appliances at home, book vehicle service appointment, etc. The voice assistant 111 communicates with the cluster controller 101a and performs the actions requested. The voice assistant 111 transmits the status of the requested activity to the speakers 304 of the audio system 103b in co-ordination with the cluster controller 101a. The audio inputs are not limited to the list mentioned above and may be updated remotely by a service engineer or an OEM of the vehicle, the head gear 103, and the instrument cluster 101 in due course of time. In an embodiment, the audio input may include multiple queries, request, or a combination of queries and requests, such as, a request for planning a trip merged with personal health information, vehicle health information, traffic information, weather information and air pollution information to provide appropriate navigational directions to the user.

Figure 6:
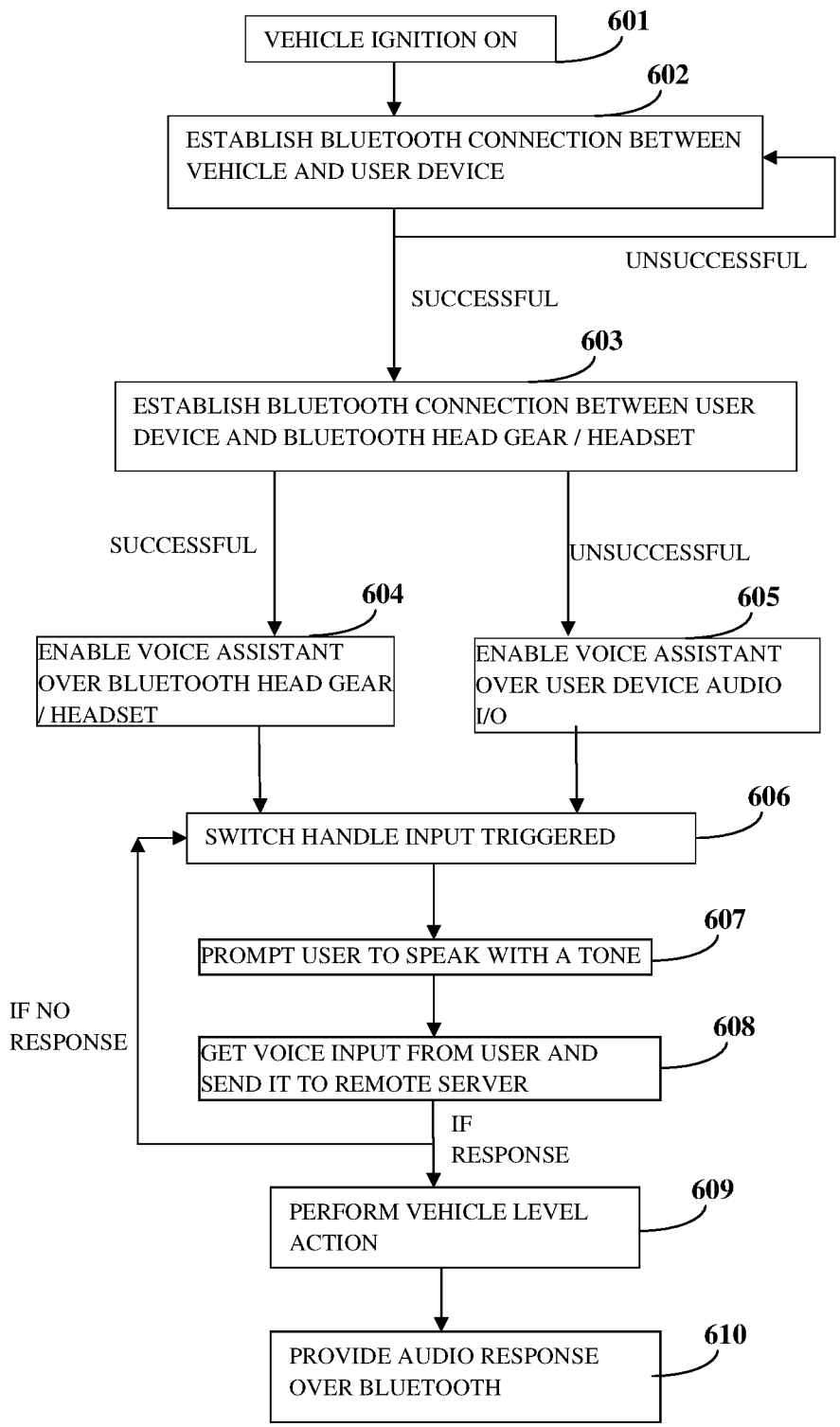
FIG. 6 exemplarily illustrates a flowchart showing invoking of the voice assistant from a vehicle interface.

FIG. 6 exemplarily illustrates a flowchart showing invoking of the voice assistant 111 from a vehicle interface, for example, the control knob 201 proximal to the indicator switches, a hard press button on the instrument cluster 101, or the cluster interface. As exemplarily illustrated, at step 601, the vehicle ignition is turned ON and step 602, a Bluetooth connection between the instrument cluster 101 of the vehicle and the user device 104 is established. If establishing the Bluetooth connection is unsuccessful, another attempt to establish the connection is done by the user of the vehicle. If the Bluetooth connection between the instrument cluster 101 and the user device 104 is established, at step 603, the Bluetooth connection between the user device 104 and the head gear 103 or the audio system 103b is established. If successful, at step 604, the voice assistant 111 is enabled over the Bluetooth head gear 103 or the Bluetooth audio system 103b. If unsuccessful at step 603, then at step 605, the voice assistant 111 is enabled over the audio I/O of the user device 104. At step 606, the control knob 201 is actuated. The control knob 201 on the handle bar, proximal to the indicator switches is triggered. In an embodiment, a hard press button on the instrument cluster 101, or the cluster interface is actuated. The voice assistant 111 is invoked. At step 607, the voice assistant 111 prompts the user to speak with a start-listening tone playing in the speakers 304 of the audio system 103b. At step 608, the voice assistant 111 receives the audio input from the user in the microphone 306 of the audio system 103b. The voice assistant 111 performs parsing and speech to text conversion of the audio input and transmits the instructions to the cluster controller 101a. At step 609, the cluster controller 101a performs the vehicle level action as described in detailed description of FIG. 5 and communicates the vehicle information to the voice assistant 111. The voice assistant 111 performs text to speech conversion using the text to speech engine 106 and transmits the vehicle information as an audio response over Bluetooth to the speakers 304 of the audio system 103b at step 610. If at step 608 the audio input from the user is not received, the voice assistant 111 has to be invoked again.

Figure 7:
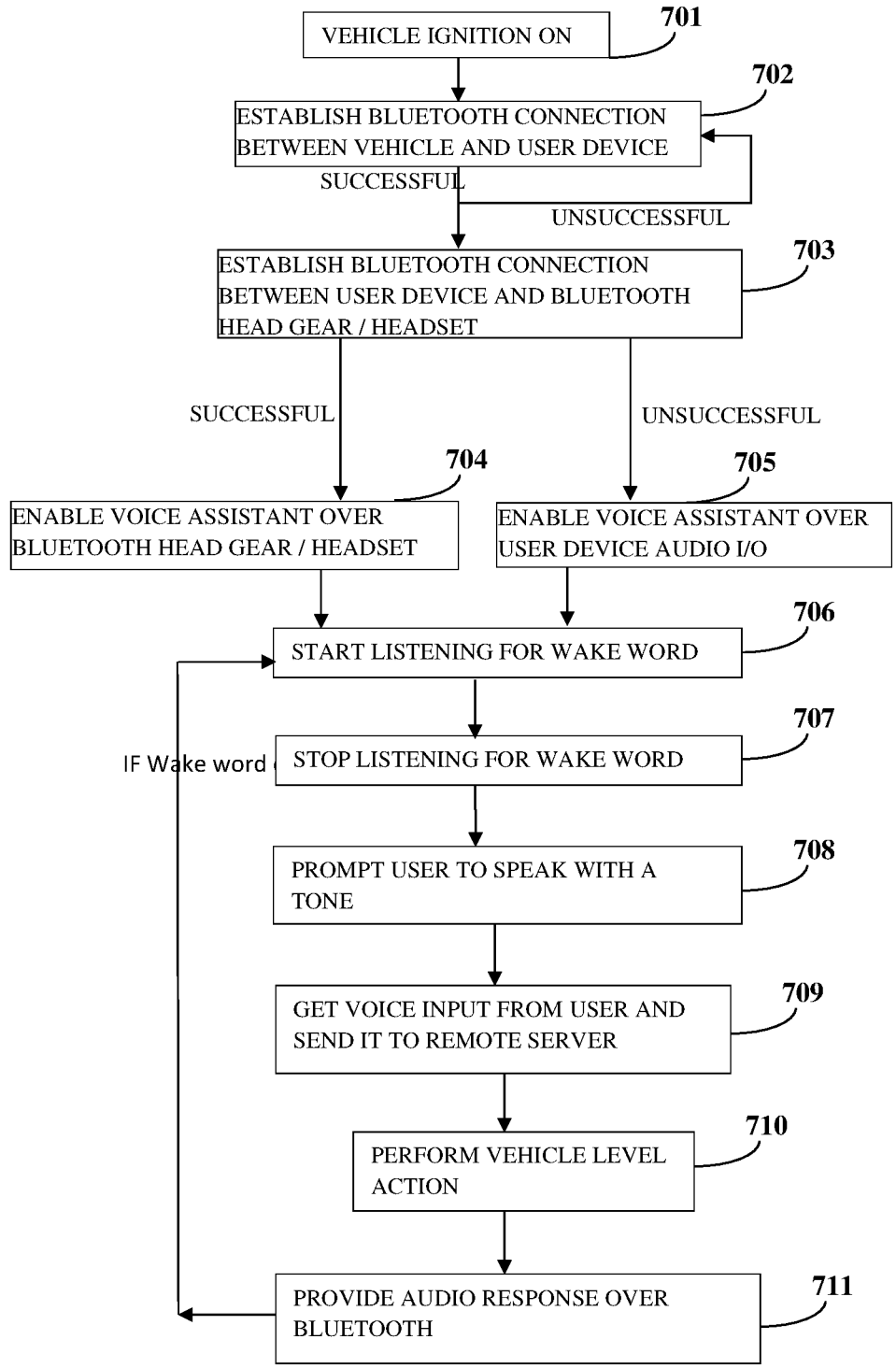
FIG. 7 exemplarily illustrates a flowchart showing invoking of the voice assistant using a voice command.

FIG. 7 exemplarily illustrates a flowchart showing invoking of the voice assistant 111 using a voice command or wake word, for example, "Hi Ntorq". As exemplarily illustrated, at step 701, the vehicle ignition is turned ON and at step 702, a Bluetooth connection between the instrument cluster 101 of the vehicle and the user device 104 is established. If establishing the Bluetooth connection is unsuccessful, another attempt to establish the connection is done by the user of the vehicle. If the Bluetooth connection between the instrument cluster 101 and the user device 104 is established, at step 703, the Bluetooth connection between the user device 104 and the head gear 103 or the audio system 103b is established. If successful, at step 704, the voice assistant 111 is enabled over the Bluetooth head gear 103 or the Bluetooth audio system 103b. If unsuccessful at step 703, then at step 705, the voice assistant 111 is enabled over the audio I/O of the user device 104. At step 706, the voice assistant 111 starts listening for the wake word from the audio system 103b. At step 707, the voice assistant 111 stops listening for the wake word from the audio system 103b. At step 708, the voice assistant 111 prompts the user to speak with a start-listening tone playing in the speakers 304 of the audio system 103b. At step 709, the voice assistant 111 receives the audio input from the user in the microphone 306 of the audio system 103b. The voice assistant 111 performs parsing and speech to text conversion of the audio input and transmits the instructions to the cluster controller 101a. At step 710, the cluster controller 101a performs the vehicle level action as described in detailed description of FIG. 5 and communicates the vehicle information to the voice assistant 111. The voice assistant 111 performs text to speech conversion using the text to speech engine 106 and transmits the vehicle information as an audio response over Bluetooth to the speakers 304 of the audio system 103b at step 711.

Figure 8:
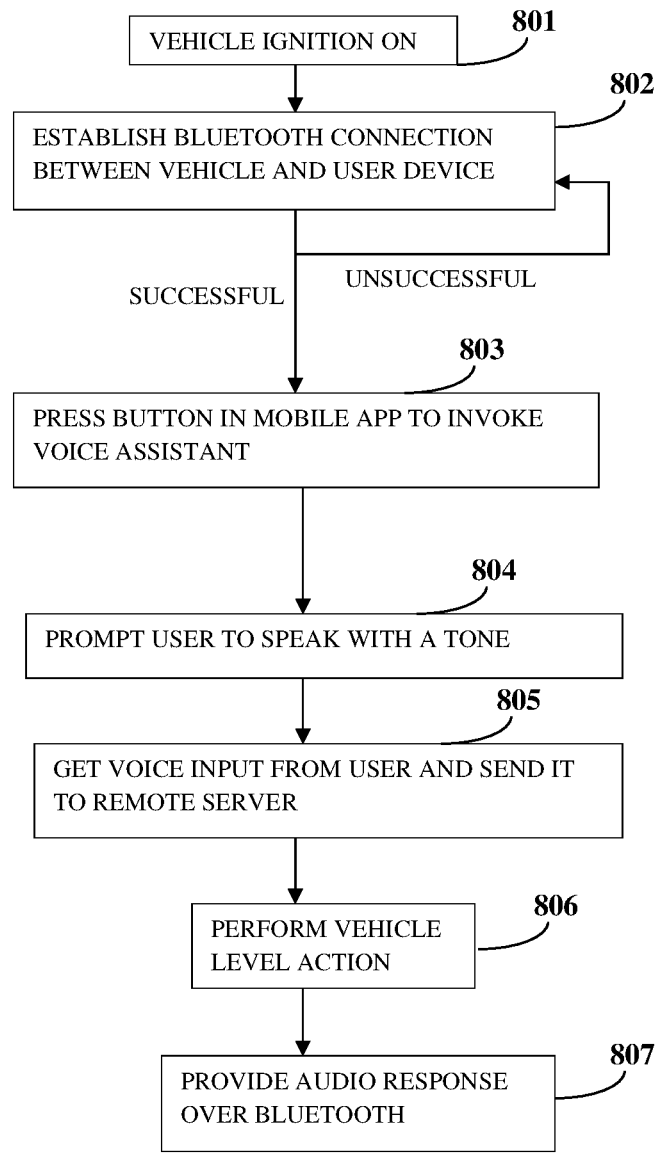
FIG. 8 exemplarily illustrates a flowchart showing invoking of the voice assistant from the voice assistant application.

FIG. 8 exemplarily illustrates a flowchart showing invoking of the voice assistant 111 from the voice assistant application 105. As exemplarily illustrated, at step 801, the vehicle ignition is turned ON and at step 802, a Bluetooth connection between the instrument cluster 101 of the vehicle and the user device 104 is established. If establishing the Bluetooth connection is unsuccessful, another attempt to establish the connection is done by the user of the vehicle. If the Bluetooth connection between the instrument cluster 101 and the user device 104 is established, at step 803, a soft press in the interface of the voice assistant application 105 in the user device 104 is pressed and the voice assistant 111 is invoked. At step 804, the voice assistant 111 prompts the user to speak with a start-listening tone playing in the speakers 304 of the audio system 103b. At step 805, the voice assistant 111 receives the audio input from the user in the microphone 306 of the audio system 103b. The voice assistant 111 performs parsing and speech to text conversion of the audio input and transmits the instructions to the cluster controller 101a. At step 806, the cluster controller 101a performs the vehicle level action as described in detailed description of FIG. 5 and communicates the vehicle information to the voice assistant 111. The voice assistant 111 performs text to speech conversion using the text to speech engine 106 and transmits the vehicle information as an audio response over Bluetooth to the speakers 304 of the audio system 103b at step 807.

Figure 9:
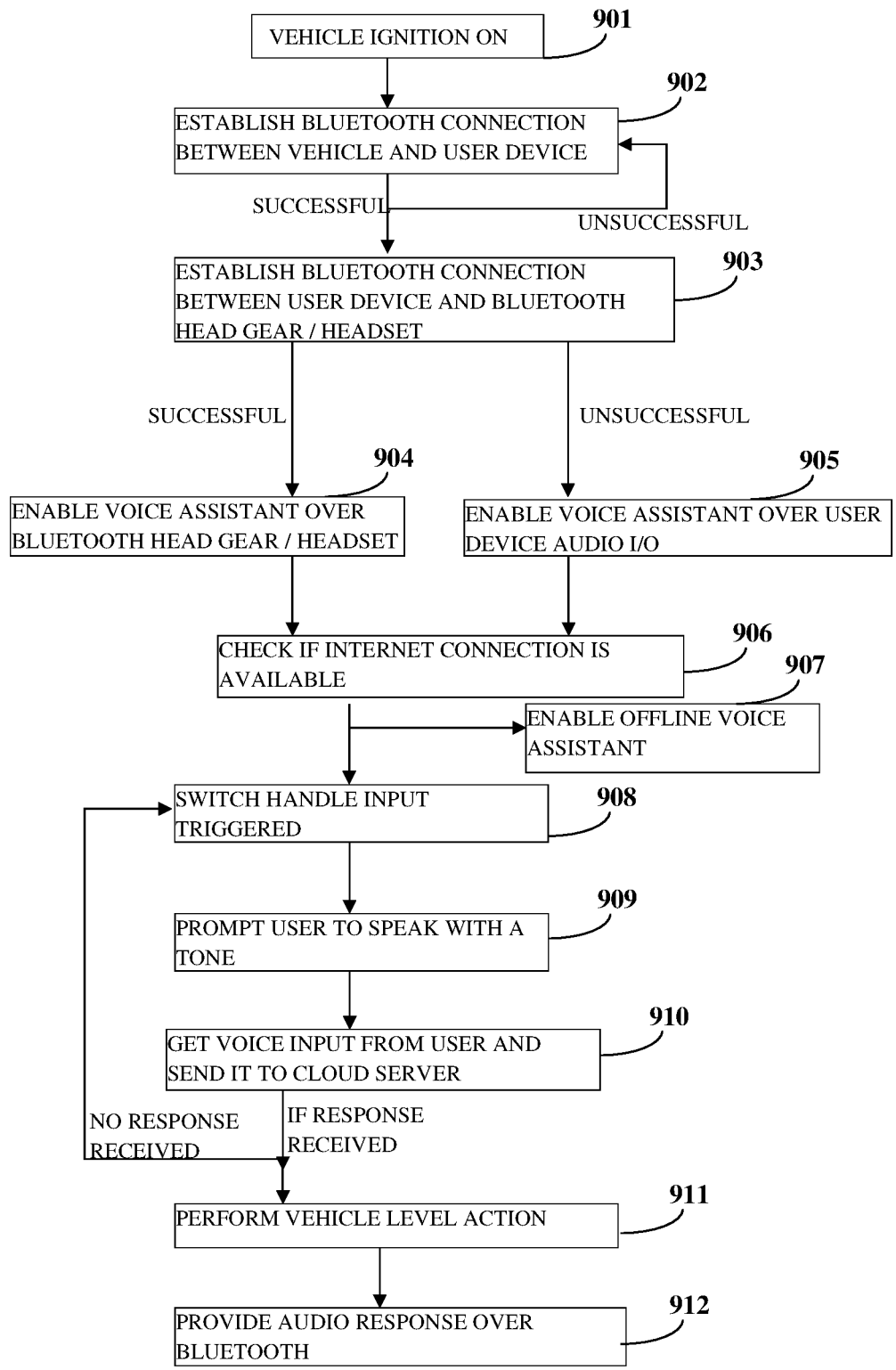
FIG. 9 exemplarily illustrates a flowchart showing invoking of the voice assistant from the vehicle interface.

FIG. 9 exemplarily illustrates a flowchart showing invoking of the voice assistant 111 from a vehicle interface, when the connection between the voice assistant application 105 and the voice cloud platform 108 is not established due to loss of the wireless network connectivity. The vehicle interface may be one of the control knob 201 proximal to the indicator switches on the handle bar, or a hard press button on the instrument cluster 101, or the cluster interface As exemplarily illustrated, at step 901, the vehicle ignition is turned ON and at step 902, a Bluetooth connection between the instrument cluster 101 of the vehicle and the user device 104 is established. If establishing the Bluetooth connection is unsuccessful, another attempt to establish the connection is done by the user of the vehicle. If the Bluetooth connection between the instrument cluster 101 and the user device 104 is established, at step 903, the Bluetooth connection between the user device 104 and the head gear 103 or the audio system 103b is established. If successful, at step 904, the voice assistant 111 is enabled over the Bluetooth head gear 103 or the Bluetooth audio system 103b. If unsuccessful at step 903, then at step 905, the voice assistant 111 is enabled over the audio I/O of the user device 104. At step 906, the voice assistant application 105 determines if wireless network connection, for example, internet connection, is available. If internet connection is not available, the voice assistant 111 on the user device 104 is enabled at step 907. At step 908, either the control knob 201 proximal to the indicator switches, or the hard press button on the instrument cluster 101, or the cluster interface is actuated and the voice assistant 111 on the user device 104 is invoked. At step 909, the voice assistant 111 prompts the user to speak with a start-listening tone playing in the speakers 304 of the audio system 103b. At step 910, the voice assistant 111 receives the audio input from the user in the microphone 306 of the audio system 103b. The voice assistant 111 performs parsing and speech to text conversion of the audio input on the user device 104 and transmits the instructions to the cluster controller 101a. At step 911, the cluster controller 101a performs the vehicle level action as described in detailed description of FIG. 5 and communicates the vehicle information to the voice assistant 111. The voice assistant 111 performs text to speech conversion using the text to speech engine 106 on the user device 104 itself, locally stores the vehicle information, and transmits the vehicle information as an audio response over Bluetooth to the speakers 304 of the audio system 103b at step 912. If at step 910 the audio input from the user is not received, the voice assistant 111 has to be invoked again.

Embodiments of the interactive protection system discussed above provides technical advancement in the domain of rider assistance as follows: The concept of configuring the vehicle instrument cluster with additional features like GPS, GSM, Wi-Fi/Bluetooth etc. along with their respective antennae, accelerometer and gyroscope etc., is simple, most power efficient, and most compact solution for communicating with the user device. The power supply needed to power the instrument cluster supplies power to all these modules. In the head gear, there is only one communication module mounted, thus manufacturing the head gear is not complex and much smaller low capacity battery will be needed. Efficiently navigation related guidance can be transferred to the audio system or the head gear, without distracting the user. Intra-module signal interference in the head gear can be avoided as now all the modules which require antennae are placed together inside the instrument cluster and antennae are placed separate enough so that signals cannot create undesirable interference. Since all the modules like GPS, GSM, Wi-Fi/Bluetooth (any wireless communication medium) etc. along with their respective antennae, accelerometer & gyroscope, vibration detector etc. are intentionally incorporated inside the instrument cluster of the vehicle, there is no need to provide extra sealing from water and dust as the instrument cluster is already a sealed module. As the head gear/audio system requires Wi-Fi/Bluetooth (any wireless communication medium) and the other modules, such as, GPS, GSM, are part of the vehicle instrument cluster, the head gear is compact and cost effective as no extra set of microprocessor/microcontrollers are needed separately for head gear and there is no need to provide a high capacity battery for head gear/audio system. Additionally, radiation induced disorders may be prevented as the antennae for the GPS/GSM module is avoided in the head gear.

Also, controlling the audio levels of the speakers, call accept/decline buttons are avoided/optional to give on an outer body of the head gear, as the control knob mounted on the handlebar, next to the indicator switches which is more convenient to use as a rider and doesn't require him/her to leave the handlebar for controlling audio system. The breath analyzer and the sleep sensor in the head gear warn the user and keep him awake until he reaches his destination to ensure safe journey. The option to enquire about the group ride status using the voice assistant allows for keeping a track of location and welfare of mates on a trip together.

Using the audio system/head gear, during a trip, the user can control vehicle settings like brightness control of the instrument cluster, the headlamp control, enquire about call information, SMS notifications, etc., navigation assistance, traffic alert, POI, change settings of vehicle interface without physically halt the vehicle or removing his/her hand from the handle bar. The voice assistant efficiently performs all these functions based on the audio input from the user. The voice assistant learns from the audio inputs and the responses everyday and holds a conversation based on the context and intent identified in the audio input. In one embodiment, the vehicular sensor data is generated from the vehicle and may be transferred over Bluetooth to the user device. The voice assistant partly embodied on the voice cloud platform avoids local storage of speech to text, text to speech data, predefined queries and corresponding responses used by the voice assistant, in the user device. Since the intelligence of the voice assistant resides in the cloud platform, the voice assistant may be easily scaled up and updated with additional queries and responses to the queries. The method to invoke the voice assistant is easy and instructions to invoke may be displayed on cluster interface, prior to start of the trip.

In an embodiment, the methods of invoking the voice assistant vary for high speed and low speed of the vehicle. At high speeds, hands-free invoking of the voice assistant using the wake word or the control knob on the handle bar will be used. At low speeds and stand still condition of the vehicle, the voice assistant is invoked using the cluster interface. The voice processing as well as query response set resides on the voice cloud platform and this thereby eliminates the constraint of memory for in-vehicle systems, such as, the instrument cluster or the user device. The voice assistant can have conversations with rider on multiple domains as part of the architecture by understanding the context of the queries. Additional query response can be added remotely and deployed without hardware or software change at mobile application or vehicle level.

Improvements and modifications may be incorporated herein without deviating from the scope of the invention.

LIST OF REFERENCE NUMERALS

101 Instrument Cluster
101a Cluster controller

101b Vehicle Wireless Transceiver
102 Wireless Network
103 Protective gear/Head gear
103a Audio Wireless transceiver
103b Audio system
104 User device
105 Voice assistant application
106 Text to Speech Engine
107 Vehicle Interface system
108 Cloud Platform
109 Speech to text Engine
110 Domain Identification and Intent Matching engine
111 Voice Assistant
201 Control Knob
202 Wireless communication module
203 Accelerometer and/or Gyroscope
204 Vibration detector
205 Power supply
206 GSM module
207 GPS module
208 Flash Memory
209 GSM antenna
210 GPS antenna
211 Cloud database
301 Breath Analyzer
302 Sleep Sensor
303 Controller
304 Speaker
305 Battery
306 Microphone
401 Outer shell
402 Inner shell
402a Inner surface of inner shell
403 Shield
404 front portion of the protective gear
405 Antenna

We claim:

1. An interactive protection system of a vehicle, the interactive protection system comprising:
a voice assistant that comprises a voice assistant application on a user device and a voice cloud platform;
an instrument cluster comprising:
a cluster controller configured to generate vehicle information based on one or more vehicular sensor data, and
at least one vehicle wireless transceiver comprising a Global System for Mobile Communication (GSM) module and configured to communicate the vehicle information to the voice assistant via a Global System for Mobile Communication (GSM) network;
an audio system disposed in proximity to a head of a user and configured to generate user information; and
an audio wireless transceiver configured to receive a vehicle information from the voice assistant via the GSM network, and transmitting the user information to the instrument cluster through the voice assistant for generating subsequent vehicle information, wherein
the voice assistant is configured to communicate the vehicle information to the audio system based on a real time output that is processed from the one or more vehicular sensor data by the cluster controller, and
the cluster controller:
transfers satellite data to the GSM module and syncs the satellite data on a cloud database when the GSM network is available, and
stores the satellite data in a flash memory when the GSM network is unavailable.

2. The interactive protection system as claimed in claim 1, wherein
the voice assistant is partially embodied in the user device and comprises:
a speech to text engine;
a domain identification and an intent matching engine that are provided for converting the user information into compatible signal format for the cluster controller; and
a text to speech engine provided for converting the vehicle information into audio form.

3. The interactive protection system as claimed in claim 1, wherein
the audio system is disposed in proximity to the head of the user within the protective gear worn by the user directly over their head and disposed proximal to an inner surface of a protective gear worn by the user of the vehicle,
the audio system comprises a microphone provided for receiving an audio input from the user, and at least one speaker configured to transmit the vehicle information to the user, and
the protective gear is one of a collared jacket on a back of the user, a neck support, and a head gear.

4. The interactive protection system as claimed in claim 3, wherein
the protective gear further comprises:
one or more second sensors for generating a second sensor data;
a power supply to source power to the audio system and the audio wireless transceiver; and
a control knob configured to control an operation of the audio system and disposed on at least one of a surface of the protective gear and a region in proximity to the instrument cluster of the vehicle, wherein
the one or more second sensors are one or more of a sleep sensor and a breath analyzer, and the user information comprises at least one of an audio input from the audio system and the second sensor data from the one or more second sensors.

5. The interactive protection system as claimed in claim 1, wherein
the voice assistant is configured to:
receive an audio input from the audio system,
be activated using one or more of an interface of the instrument cluster, a voice command as an audio input, and a control knob of the audio system, and
control one or more actuators of a plurality of vehicle components based on the user information from the audio system.

6. The interactive protection system as claimed in claim 1, wherein
the one or more vehicular sensor data is generated by at least one of one or more speed sensors, one or more accelerometers, one or more level sensors, one or more vibration detectors, one or more gyroscope, one or more temperature sensors, one or more location sensors, and one or more pressure sensors, one or more of the sensors being mounted on one of a body of the vehicle and the instrument cluster of the vehicle,
the one or more vehicular sensor data comprises one or more of an indicator status, speed of the vehicle, energy levels of the vehicle, location of the vehicle, vibration in the vehicle, acceleration of the vehicle, tilt of the vehicle, and data on ambient conditions surrounding the vehicle including temperature, air pressure of wheels, and gear position, and the vehicle information comprises one or more of an alert on the energy levels of the vehicle, alert on speed of the vehicle, alert on indicator status, alert in tilt of the vehicle, alert on location of the vehicle, navigation guidance, call alert, ambient weather, trip information, news coverage, alert on drop of the user device, service history of the vehicle, group ride status, and emergency service assistance.

7. An interactive protection system of a vehicle comprising:

an instrument cluster comprising:
a cluster controller configured to generate vehicle information that is based on one or more vehicular sensor data, and
at least one vehicle wireless transceiver comprising a Global System for Mobile Communication (GSM) module and configured to communicate the vehicle information to a protective gear of a user via a Global System for Mobile Communication (GSM) network, the protective gear being worn by the user; and the protective gear comprising:
an audio system disposed in proximity to an inner surface of the protective gear for generating user information, and
an audio wireless transceiver configured to receive the vehicle information from the instrument cluster through the at least one vehicle wireless transceiver and transmitting the user information to the instrument cluster for generating subsequent vehicle information, wherein the cluster controller:
communicates the vehicle information to the audio system based on a real time output that is processed from the one or more vehicular sensor data,
transfers satellite data to the GSM module and syncs the transferred satellite data on a cloud database when the GSM network is available, and
stores satellite data in a flash memory when the GSM network is unavailable.

8. The interactive protection system as claimed in claim 7, wherein the protective gear further comprises one or more second sensors for generating a second sensor data, a power supply to source power to the audio system and the audio wireless transceiver, and a heads-up display unit for displaying the vehicle information as augmented reality, the one or more second sensors are one or more of a sleep sensor and a breath analyzer, the user information comprises an audio input from the audio system and the second sensor data from the one or more second sensors, and the audio system comprises a microphone provided for receiving an audio input from the user, and at least one speaker configured to transmit the vehicle information to the user, wherein, the protective gear is one of a collared jacket on a back of the user, a neck support, and a head gear, the audio system is connected with a user device through the instrument cluster for one or more of receiving calls, receiving messages, and storing media, and a control knob is configured to control an operation of the audio system and disposed on at least one of a surface of the protective gear and a region in proximity to the instrument cluster of the vehicle.

9. The interactive protection system as claimed in claim 8, wherein
the cluster controller is configured to:
wirelessly receive the user information from the protective gear.

10. The interactive protection system as claimed in claim 7, wherein the one or more vehicular sensor data comprises one or more of a speed of the vehicle, energy levels of the vehicle, location of the vehicle, vibration of the vehicle, acceleration of the vehicle, tilt of the vehicle, and data on ambient conditions surrounding the vehicle, the data on ambient conditions including temperature, air pressure of wheels, and gear position, the one or more vehicular sensor data is generated by at least one of one or more speed sensors, one or more accelerometers, one or more level sensors, one or more vibration detectors, one or more gyroscope, one or more temperature sensors, one or more location sensors, and one or more pressure sensors, one or more of the sensors being mounted on one of a body of the vehicle and the instrument cluster of the vehicle, and the vehicle information comprises one or more of an alert on the energy levels of the vehicle, alert on speed of the vehicle, alert on location of the vehicle, navigation guidance, and call alert.

11. A protective gear, the protective gear being worn by a user of a vehicle, the protective gear comprising:
an audio system disposed in proximity to an inner surface of the protective gear for generating user information; and
an audio wireless transceiver configured to receive vehicle information from an instrument cluster of the vehicle and transmitting the user information to the instrument cluster for generating subsequent vehicle information.

12. The protective gear as claimed in claim 11, wherein
the protective gear further comprises one or more second sensors for generating a second sensor data and a power supply to source power to the audio system,
the one or more second sensors are one or more of a sleep sensor and a breath analyzer, and the protective gear is one of a collared jacket on a back of the user, a neck support, and a head gear.

13. The protective gear as claimed in claim 11, wherein
the vehicle information comprises one or more of an alert on energy levels of the vehicle, alert on speed of the vehicle, alert on location of the vehicle, navigation guidance, and call alert based on the one or more vehicular sensor data,
the one or more vehicular sensor data comprises one or more of a speed of the vehicle, the energy levels of the vehicle, location of the vehicle, vibration of the vehicle, acceleration of the vehicle, tilt of the vehicle, data on ambient conditions temperature, air pressure of wheels, and gear position, and
the one or more vehicular sensor data is generated by at least one of one or more speed sensors, one or more accelerometers, one or more level sensors, one or more vibration detectors, one or more gyroscope, one or more temperature sensors, one or more location sensors, and one or more pressure sensors, one or more of the sensors being mounted on one of a body of the vehicle and the instrument cluster of the vehicle.

14. A method for wireless communication between a vehicle and a user of the vehicle, the method being executed by an interactive protection system that comprises: an instrument cluster comprising a cluster controller configured to generate vehicle information based on one or more vehicular sensor data and at least one vehicle wireless transceiver comprising a Global System for Mobile Communication (GSM) module and configured to communicate the vehicle information to a voice assistant partially embodied in a user device via a Global System for Mobile Communication (GSM) network; an audio system disposed in proximity to a head of the user and configured to generate user information; and an audio wireless transceiver configured to receive a vehicle information from the voice assistant via the GSM network, and communicating the user information to the instrument cluster through the voice assistant for generating subsequent vehicle information, the method comprising the steps of:

invoking the voice assistant using one of an interface of the instrument cluster, a voice command from the audio system, and a control knob of the audio system;

receiving the user information from the audio system by the voice assistant;

converting the user information to a compatible format of the cluster controller, by the voice assistant;

controlling actuators of a plurality of vehicle components by the cluster controller, based on the converted user information from the audio system;

generating vehicle information by the cluster controller from the one or more vehicular sensor data, based on the converted user information; transmitting the vehicle information to the audio system by the voice assistant;

communicating, by voice assistant, the vehicle information to the audio system based on a real time output that is processed from the one or more vehicular sensor data by the cluster controller;

transferring, by the cluster controller, satellite data to the GSM module and syncing the satellite data on a cloud database when the GSM network is available; and storing, by the cluster controller, the satellite data in a flash memory when the GSM network is unavailable.

15. The method as claimed in claim 14, wherein the audio system is disposed in proximity to a head of the user within a protective gear worn by the user directly over their head and disposed in proximity to an inner surface of the protective gear worn by the user of the vehicle, a control knob is configured to control an operation of the audio system and disposed on at least one of a surface of the protective gear and a region in proximity to the instrument cluster of the vehicle, the voice assistant comprises a voice assistant application on the user device and a voice cloud platform, and the protective gear is one of a collared jacket on a back of the user, a neck support, and a head gear.

\* \* \* \* \*